United States Patent [19]

Morishita et al.

[11] Patent Number: 4,626,724
[45] Date of Patent: Dec. 2, 1986

[54] WATERPROOF DEVICE FOR ELECTRIC MOTOR

[75] Inventors: Akira Morishita, Himeji; Taiichi Nakagawa, Takasago; Akinori Hasegawa, Hyogo, all of Japan

[73] Assignee: Mitsubishi Denki Kabushiki Kaisha, Tokyo, Japan

[21] Appl. No.: 729,223

[22] Filed: May 1, 1985

[30] Foreign Application Priority Data

May 17, 1984 [JP] Japan ............... 59-73451[U]

[51] Int. Cl.$^4$ ............................................. H02K 5/10
[52] U.S. Cl. ................................. 310/88; 310/43;
310/45; 310/71; 310/89; 310/154
[58] Field of Search ............ 310/85, 89, 88, 42,
310/43, 154, 45, 87, 192, 194, 71, 258; 123/179
M; 290/38 R, 38 A, 48; 74/7 R, 7 A

[56] References Cited

U.S. PATENT DOCUMENTS

| | | | |
|---|---|---|---|
| 2,311,805 | 2/1943 | Yost | 310/71 UX |
| 3,877,142 | 4/1975 | Hamano et al. | 310/194 |
| 3,982,146 | 9/1976 | Hokky | 310/89 |
| 4,101,794 | 7/1978 | Miller et al. | 310/71 |
| 4,116,077 | 9/1978 | Mazzorana | 74/7 A |
| 4,347,442 | 8/1982 | White et al. | 310/43 |
| 4,412,146 | 10/1983 | Futterer et al. | 310/43 |
| 4,451,750 | 5/1984 | Hever et al. | 310/88 |
| 4,506,162 | 3/1985 | Bolenz et al. | 290/38 A |
| 4,525,632 | 6/1985 | Tanaka | 290/48 |

FOREIGN PATENT DOCUMENTS

| | | | |
|---|---|---|---|
| 0031347 | 3/1981 | Japan | 310/88 |
| 57-160968 | 10/1982 | Japan . | |
| 0159645 | 9/1983 | Japan | 310/88 |
| 59-64583 | 12/1983 | Japan . | |
| 1281107 | 7/1972 | United Kingdom . | |

*Primary Examiner*—R. Skudy
*Attorney, Agent, or Firm*—Oblon, Fisher, Spivak, McClelland & Maier

[57] ABSTRACT

In a waterproof device for an electric motor having a cylindrical motor frame body which is split into a discrete portions in the axial direction of the motor, an annular elastic member is attached onto the motor frame body in a manner to cover the joined portions of the split frame body, and a lead-out portion having an insertion port is formed in the elastic member to enable a power supply lead wire for the electric motor to be pushed into the insertion port.

6 Claims, 4 Drawing Figures

WATERPROOF DEVICE FOR ELECTRIC MOTOR

BACKGROUND OF THE INVENTION

1. Field of the Invention

This invention relates to an improvement in a waterproof device for an electric motor.

2. Description of Prior Art

As a known art, this kind of waterproof device for the electric motor is disclosed in an unexamined Japanese Utility Model Publication No. 160968/1982, which has a construction as shown in FIG. 1 of the accompanying drawing. Explaining such known waterproof device for the electric motor in reference to the drawing, reference numerals 1 and 2 respectively designate a front bracket and a rear bracket of a starter motor, both being split in the axial direction of the electric motor and constituting the separate frame members therefor; a numeral 3 refers to a yoke; a numeral 4 refers to a magnetic switch; and a reference numeral 5 indicates a dip-coated layer. The dip-coated layer 5 is formed by dipping the motor in a vessel containing vinylchloride solution. With this dip-coated layer 5, gaps at the fitting portions among the front bracket 1, the rear bracket 2, and the yoke 3 are perfectly sealed, whereby the waterproof function of the electric motor can be maintained.

In this conventional waterproof device for the electric motor, however, the waterproofed film of the dip-coated layer 5 tends to be peeled off the motor main body due to influence of heat change, or other causes to become unable to maintain its waterproofing function.

The present invention has been made in view of such circumstances and in an attempt to remove such disadvantage inherent in the conventional waterproof device for the electric motor.

SUMMARY OF THE INVENTION

It is therefore an object of the present invention to provide a waterproof device for an electric motor having improved waterproofing property of the frame member of the motor with a very simple construction of attaching an annular elastic member onto a cylindrical frame of the electric motor in a manner to cover the joined portions of the split frame members.

According to the present invention in general aspect of it, there is provided a waterproof device for an electric motor having a cylindrical motor frame body which is split into a discrete portions in the axial direction of th motor, characterized in that an annular elastic member is attached onto said motor frame body in a manner to cover the joined portions of the split frame body, and that a lead-out portion having an insertion port is formed in said elastic member to enable a power supply lead wire for said electric motor to be pushed into the insertion port.

BRIEF DESCRIPTION OF DRAWING

The foregoing object, other objects as well as specific construction and function of the water proof device for the electric motor according to the present invention will become more apparent and understandable from the following detailed description thereof, when read in conjunction with the accompanying drawing.

In the drawing.

DETAILED DESCRIPTION OF THE PREFERRED EMBODIMENTS

In the following, the construction of the present invention will be described in detail with reference to the accompanying drawing.

Figure 1:
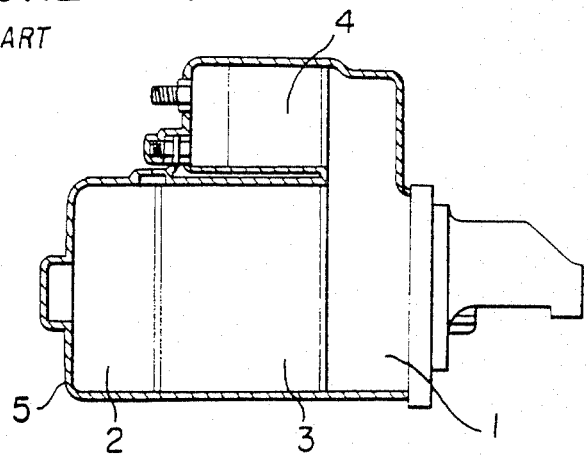
FIG. 1 is a schematic side elevational view showing a conventional waterproof device for an electric motor.
Figure 2:
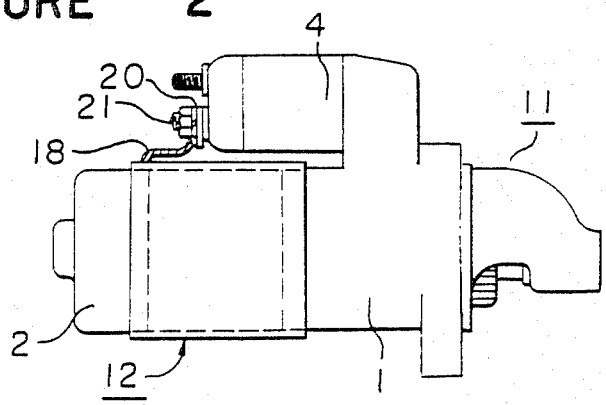
FIGS. 2 and 3 are respectively a side elevational view and a partial longitudinal cross-sectional view of the waterproof device for the electric motor according to the present invention.
Figure 3:
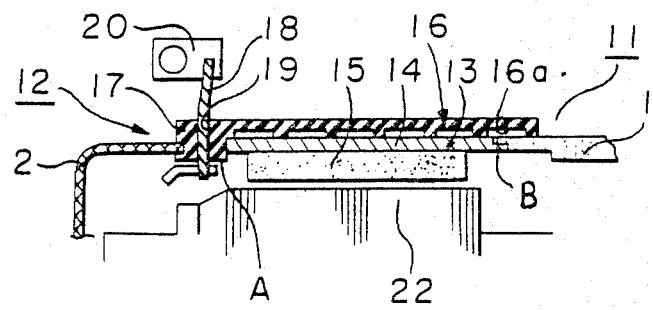

FIGS. 2 and 3 are respectively a side elevational view and a partial longitudinal cross-sectional view of the waterproof device for the electric motor according to the present invention. In these figures of the drawing, the same component members as those of FIG. 1 are designated by the same reference numerals and detailed explanations thereof will be dispensed with.

In the drawing, a reference numeral 11 designates a starter. A stator 13 of a d.c. electric motor 12 is fixed between the front bracket 1 as the cylindrical front frame and the rear bracket 2 as the cylindrical rear frame. In other words, the stator 13 has both end parts of its yoke 14 joined in groove fitting to both front bracket 1 and the rear bracket 2. Magnetic poles 15 made of a ferrite permanent magnet material are glued to the inner peripheral surface of the yoke 14 with an adhesive agent.

An annular elastic member 16 of rubber or another elastic material having a number of recesses or grooves 16a is attached onto the front bracket 1, the rear bracket 2, and the yoke 14 in a manner to be opposite to the outer peripheral surface of the yoke 14 and to cover the split portion between the two brackets 1 and 2. A lead-out portion 17 having an insertion port 19, into which a power supply lead wire 18 of the above-mentioned d.c. electric motor 12 can be intromitted under pressure is formed in the elastic member 16 so as to be positioned between the rear bracket 2 and the yoke 14. A connector 20 for connecting the power supply lead wire 18 is fixed to a terminal bolt 21 of the magnetic switch 4. There is provided an armature 22 which is energized by the stator 13 and brought into rotation by electric conduction from the power supply lead wire 18 through a commutator brush (not shown in the drawing). In the drawing, a reference letters A and B indicate the groove fitting parts of the yoke 14.

In the above-described construction of the waterproof device of the electric motor, since the elastic member 16 covers the groove fitting parts A and B, and is in close contact with the outer peripheral surface of the front bracket 1, the rear bracket 2, and the yoke 14 as well as the power supply lead wire 18, the sealing property of this portion of the electric motor can be securely maintained with a single member.

Further, since the elastic member 16 protects the outer peripheral surface of the stator 13 with its elasticity, any possible damage to the magnetic poles 15 due to external shock can be prevented.

Figure 4:
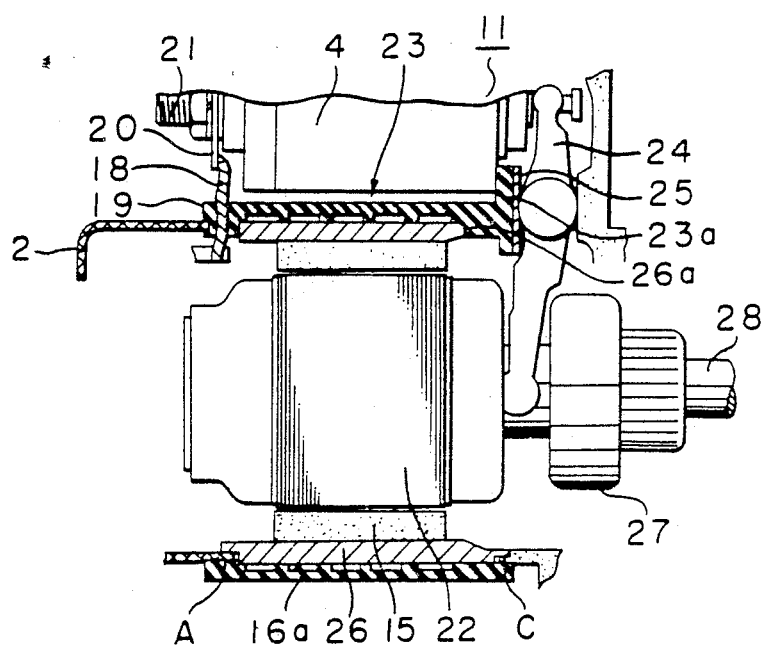
FIG. 4 is a longitudinal cross-sectional view of the waterproof device according to another embodiment of the present invention.

In the above-described embodiment of the present invention, one example has been shown, in which the elastic member 16 has a function of sealing the clearances at the groove fitting parts A and B, and the clearance between the power supply lead wire 18 and the insertion port 19. However, the present invention is not limited to this embodiment alone, but the elastic member 23 may have a grommet 23a formed integrally therewith, which serves to seal a portion of a shift lever 24 of the starter 11, as shown in FIG. 4. In this case, the elastic member 23 is in contact with the shift lever 24 through a spacer 25, and a notch 26a is formed at the groove fitting part C of the yoke 26. In addition, a reference numeral 27 designates an over-running clutch to be spline-connected in a freely slidable manner on the rotational shaft 28 of the armature 22.

As has so far been described, since the present invention is designed to attach the elastic member onto the frame body of the electric motor in a manner to cover the split portion of the frame body, and to form in this elastic member a lead-out portion having an insertion hole to enable a power supply lead wire of the electric motor to be pushed into it, the waterproofing function of the motor can be secured and its operational reliability can be improved. Further, by covering the outer peripheral surface of the stator or the electric motor with the elastic member, the stator can be protected from any external shock by the elasticity of the member.

Although, in the foregoing, the present invention has been described with reference to a couple of preferred embodiments thereof, these embodiments should be taken as illustrative only and not so restrictive. Rather, any chages and modifications may be made to it by those persons skilled in the art within the ambit of the present invention as recited in the appended claims.

What is claimed:

1. A waterproof device for an electric motor having a cylindrical motor frame body and a power supply lead wire extending from the interior of said motor frame body to the exterior thereof, said motor frame body being formed from at least three discrete portions disposed along the axial direction of the motor and meeting one another at respective split portions of said motor frame body,
said waterproof device comprising an annular elastic member attached onto an outer surface of said motor frame body and sealingly covering said split portions,
said elastic member comprising a lead-out portion positioned between two of said discrete portions and having therein an insertion port receiving said lead wire.

2. A waterproof device for an electric motor according to claim 1, wherein said annular elastic member is made of rubber.

3. A waterproof device for an electric motor according to claim 1, wherein said at least three discrete portions of said motor frame body comprise a front bracket, a rear bracket and a yoke, which are connected at said respective split portions by groove fitting.

4. A waterproof device for an electric motor according to claim 3, wherein magnetic poles made of a ferrite permanent magnet are secured to an inner peripheral surface of said yoke.

5. A waterproof device for an electric motor according to calim 1, wherein said electric motor is a starter motor and said annular elastic member has a grommet formed integrally therewith which seals a portion of a shift lever of said starter.

6. A waterproof device for an electric motor according to claim 3, wherein said outer surface of said motor frame body comprises an outer surface of said yoke, said annular elastic member being attached onto said outer surface of said yoke and covering a part of each of said front and rear brackets.

* * * * *